Oct. 15, 1935.  R. E. SCHLEY  2,017,107
FLUID POWER TRANSMISSION
Filed Jan. 11, 1929  2 Sheets-Sheet 1

INVENTOR.
Rudolph E. Schley
BY
Erwin, Wheeler & Woolard
ATTORNEYS

Oct. 15, 1935.  R. E. SCHLEY  2,017,107

FLUID POWER TRANSMISSION

Filed Jan. 11, 1929  2 Sheets-Sheet 2

INVENTOR.
Rudolph E. Schley
BY
Erwin, Wheeler & Woolard
ATTORNEYS

Patented Oct. 15, 1935

2,017,107

UNITED STATES PATENT OFFICE 2,017,107

FLUID POWER TRANSMISSION

Rudolph E. Schley, Beaver Dam, Wis.

Application January 11, 1929, Serial No. 331,800

3 Claims. (Cl. 103—120)

This invention relates to improvements in fluid power transmission.

In general it is an object of this invention to provide a hydraulic transmission enclosed in a rotatable casing axially aligned with two power shafts and automatically locked against rotation when the speed of rotation of one of the shafts is less than the other of the shafts.

More specifically it is an object of this invention to provide a driving shaft having a variable capacity rotary pump, a driven shaft axially aligned with the first shaft and having a fixed capacity hydraulic motor under the influence of the pump, and a rotatable casing enclosing the pumps and motor and which will be automatically locked against rotation in one direction, the casing being subject to the reactive forces generated in the pump and motor.

Other objects are to simplify the controls for determining the direction of rotation of the motor, to reduce the number of parts in the transmission, to provide means for automatically sealing such openings as might permit fluid to leave the transmission casing, and to provide means for compensating for the expansion and contraction of fluid in the transmission.

In the drawings.

Like parts are identified by the same reference characters throughout the several views.

The operation of the device hereinafter described is similar to that disclosed in my Letters Patent, No. 1,588,996, issued June 15, 1926. There are, however, features incorporated in the present design which render the transmission much more simple and reliable in securing the results desired. These features will become apparent as the description progresses.

Figure 3:
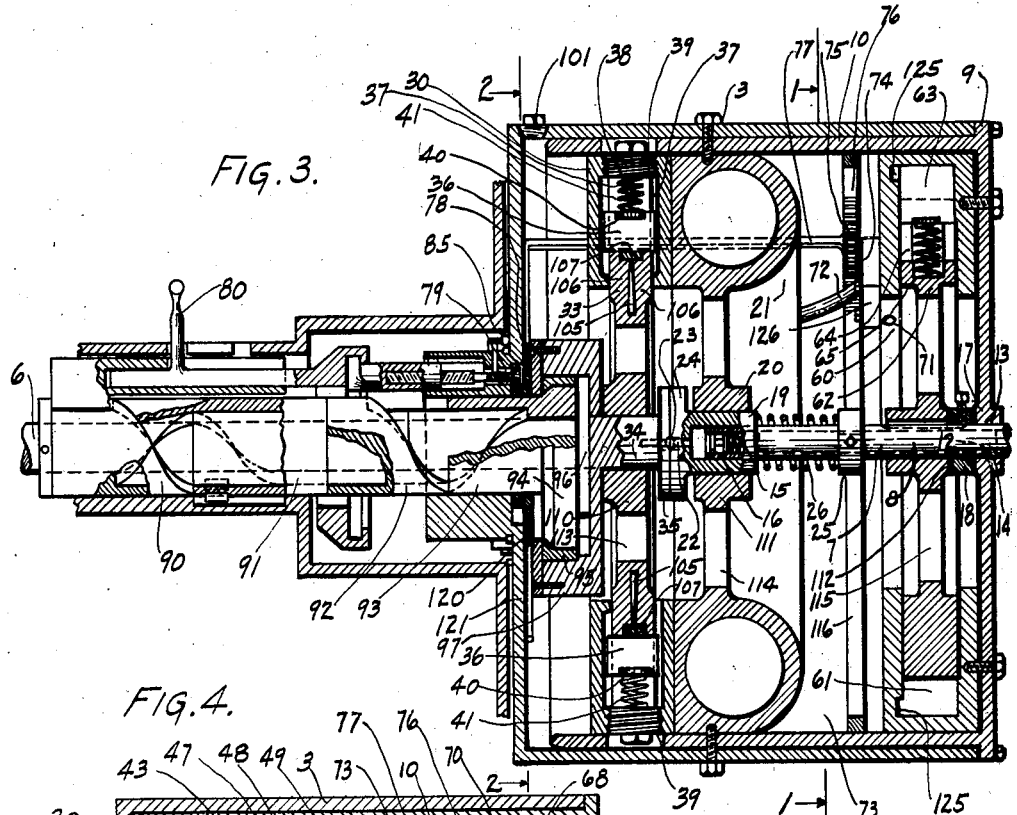
Figure 3 is a sectional view taken axially of the transmission and corresponding in position to the line 3—3 of Fig. 1.
Figure 4:
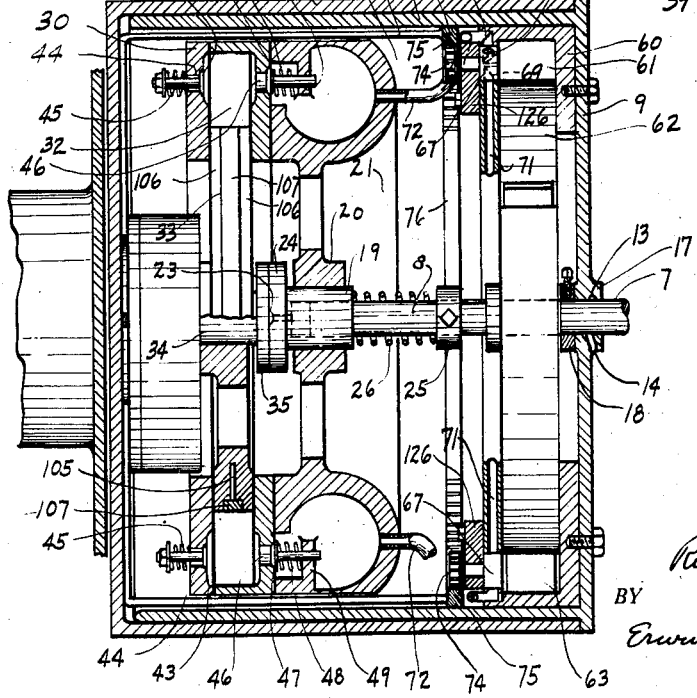
Figure 4 is a fragmentary sectional view similar to Fig. 3 but corresponding in position to the line 4—4 of Fig. 2.

The power generating or pumping unit is shown in Figures 3 and 4 at the left of the rotatable casing 3 and the motor or power receiving unit is shown in the same figures at the right of casing 3. The casing 3 is closed at the motor end by a disk 9 which in the patent referred to is shown having arms extending into the casing but which in the present case is provided with a cylindrical portion 10 extending into the casing.

Extending into the pump end of the casing is a power or driving shaft 6 and extending into the motor end of the casing is a transmission or driven shaft 7 which is preferably tubular at the end 8 extending into the casing 3. The bottom of the tubular end 8 is provided with an aperture 12 which registers with an annular groove 13 in the hub or bearing portion 17 of the disk 9. This groove is provided with an aperture 14 extending to the exterior of the casing. Within the tubular end of the shaft 7 is disposed a helical spring 15 against which is seated a plunger or piston 16. Secured to the shaft 7 adjacent the bearing portion 17 is a collar 18.

The shaft at its inner end extends into a sleeve 19 which acts as a bearing for the shaft and a bushing in the hub 20 carried by an annular chamber 21 carried by the casing 3 interiorly thereof. Extending from the interior of sleeve 19 is a hole 22 which communicates with the slot 23 extending radially of the face of the disk portion 24 of the sleeve 19. Secured to the shaft 7 is a collar 25 and extending between the collar 25 and sleeve 19 is a helical spring 26 which serves to urge the sleeve 19 from the collar 25.

The pump is provided with an annular pump casing 30 secured to the rotatable casing 3 by any suitable means such as bolts 31. The pump casing 30 is provided with an annular chamber 32 into which the pump disk 33 extends. The disk 33 is rotatably mounted on the variable throw crank pin 34. Secured to the end of the crank pin is a disk 35 against which the sleeve disk 24 bears. Pin 34 is movable radially of the shaft 6 by mechanism disclosed in the foregoing mentioned letters patent and hereinafter briefly described.

Disposed within the chamber 32 are blades 36 movable radially of the casing 30 in slots 37. The blades contact with the periphery of the disk 33 and are maintained in such contact by springs 38 which bear against plugs 39 and against the plates 40 secured to the blades 36. The plates 40 reciprocate in the spring chambers 41 and are provided with apertures 42 upon one side of the blade. The apertures 42 permit the fluid pressures generated in the pump to be equalized upon the opposite faces of plates 40.

As will be noted, the chamber 32 is, by the blades 36 divided into four compartments, each compartment extending radially beyond the outer or greater course of travel of the disk 33 as will subsequently be noted. Thus a space is provided within which the valves 43 may operate without interference from the disk 33. The valves 43 control inlet openings 44 and are maintained normally in closed position by the springs 45. Upon the opposite side of the chamber 32 from the valves 43 are provided outlet openings 46 each controlled by a valve 47. The valves 47 are normally maintained in closed position by the spring 48 which bears against the lug 49. As will subsequently appear, fluid will be drawn through openings 44 into the several compartments of chamber 32 and will be forced from chamber 33 through openings 46 into the chamber 21.

The motor is of the rotary type and includes a casing 60 having an annular channel 61 upon its inner periphery. Within the chanel 61 is a rotary disk member 62 having three vanes 63 each movable radially of the disk within respective slots 64 and actuated normally outwardly by springs 65. The vanes 63 slide upon the bottom of the channel 61 and thus divide the channel into three compartments as will be clearly observed in Figure 1.

The casing 60 of the motor is secured to in any suitable manner and revolves with the casing 3 of the transmission. The disk member 62 is keyed to the driven shaft 7. The channel 61 is preferably concentric with the axis of the shaft 7 for approximately one-half of its periphery, the other half being disposed in an arc of a circle which extends into the space within the other circle. It will thus be seen from an inspection of Figure 1, that the vanes 63 will be periodically forced into their respective slots and the several chambers lessened in cubic capacity. At the junctures of the two halves of the periphery of the channel 61 just described, are provided rotary valves 67 having ports 68 and 69 communicating with the channel 61 and alternately with the inlet port 70 and outlet port 71, respectively. Port 70 communicates through pipe 72 with the chamber 21 and port 71 communicates with the space 73 within the casing 3. When the upper valve through port 68 and pipe 72 places the chamber 21 in communication with the motor chamber 61, the lower valve through ports 69 and 71 places the motor chamber 61 in communication with the space 73, and vice versa.

Each of the valves 67 is provided with a pinion 74 which meshes with an internal gear portion 75 upon the ring 76 which may be moved rotatably upon the casing 3. This ring 76 is connectably with the arms 77 extending longitudinally of the casing 3. Arms 77 are each provided with inwardly extending portions secured to the gear collar 78. This collar may be rotated by appropriate movement of the lever 80 through the mechanism shown in Figure 1. This mechanism is not here described in detail for the reason that a full disclosure thereof is made in my Patent Number 1,588,996, issued June 15, 1926 for Fluid power transmission. As will be observed when the gear collar 78 is rotated in either direction a corresponding movement of the pinions 74 will take place and result in rotation of the valves 67.

The mechanism shown at 85 is controlled from the handle 80 by mechanism fully disclosed in the previously mentioned patent and serves the purpose of holding the casing 3 against rotation in either direction according to the reaction caused by the motor. The reaction of the motor against the casing 3 will be opposite to the direction that shaft 7 is being driven.

The crank pin 34 may be varied in its radial distance from the axis of shaft 6 by proper rotation of the handle 80. Movement of the handle away from the observer as viewed in Figure 1 will cause the sleeve 90 to rotate in a like direction. Sleeve 90 in turn will move the sleeve 91 axially of the shaft 6 which in turn will move the sleeve 92 in the same direction. Sleeve 92 will cause the sleeve 93 to rotate in the same direction that sleeve 90 rotates. Sleeve 93 carries a cam 94 which, through bearing member 95, guide block 96, and member 97 which carries crank pin 34, will move the crank pin radially outwardly of the shaft 6 a distance determined by the extent of movement of handle 80. Crank pin 34 may be moved radially inwardly of the shaft 6 by rotating the handle 80 in a direction opposite to that just noted. The mechanism for manually changing the position of the crank pin 34, is not here fully described since a full disclosure thereof is made in the previously mentioned patent and in my Patent Number 1,676,506 issued July 10, 1928 for Mechanical movements.

Guide block 96 acts as a connection between shaft 6 and member 97, thus when shaft 6 is rotated the crank pin 34 will be rotated. Consequently, when the pin 34 is positioned radially of the axis of the shaft, it will carry the pump disk 33 about the axis of shaft 6. This movement of disk 33 will vary the cubic space between the vanes 36 and thereby alternately draw fluid from the space 73 in the casing 3 through the valves 43 and into the several spaces between the vanes 36.

As soon as each space between the valves 43 has been filled, the fluid will be forced out past the valves 47 and into chamber 21. As the chamber 21 will be filled with fluid any further inflow thereof must be compensated for by an outflow of fluid through either of the pipes 72. Valves 67 will determine which of the pipes 72 the fluid will pass out. Assuming that the fluid is passing from the chamber 21 through the upper pipe 72 past the corresponding valve 67 and into the motor, fluid will be passing out of the motor through the lower outlet 71 and into the space 73.

Figure 1:
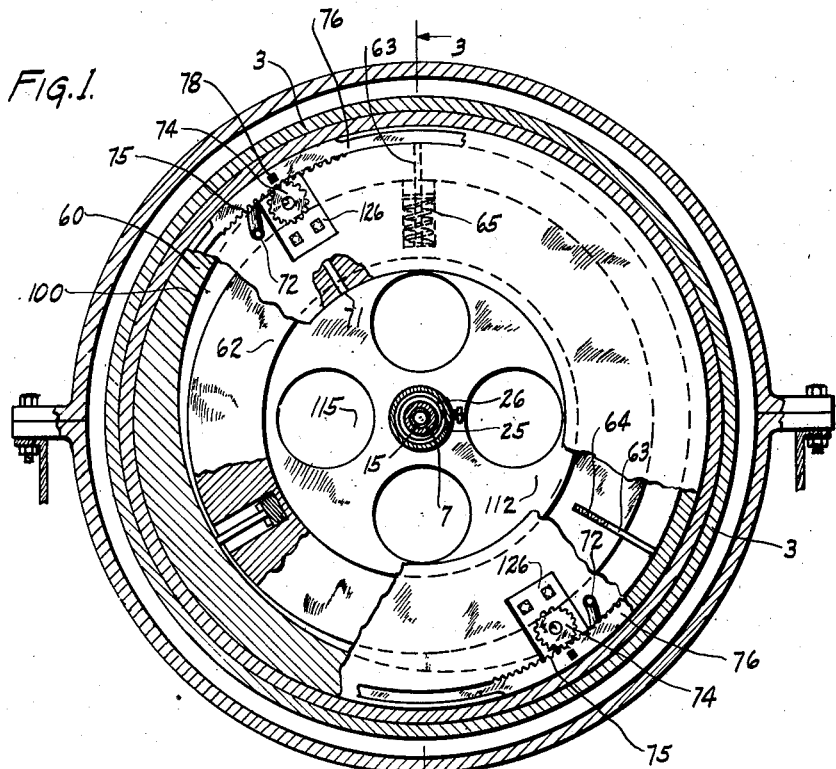
Figure 1 is a sectional view of the transmission taken on the line 1—1 of Fig. 3 and showing the motor in side elevation with portions in section.
Figure 2:
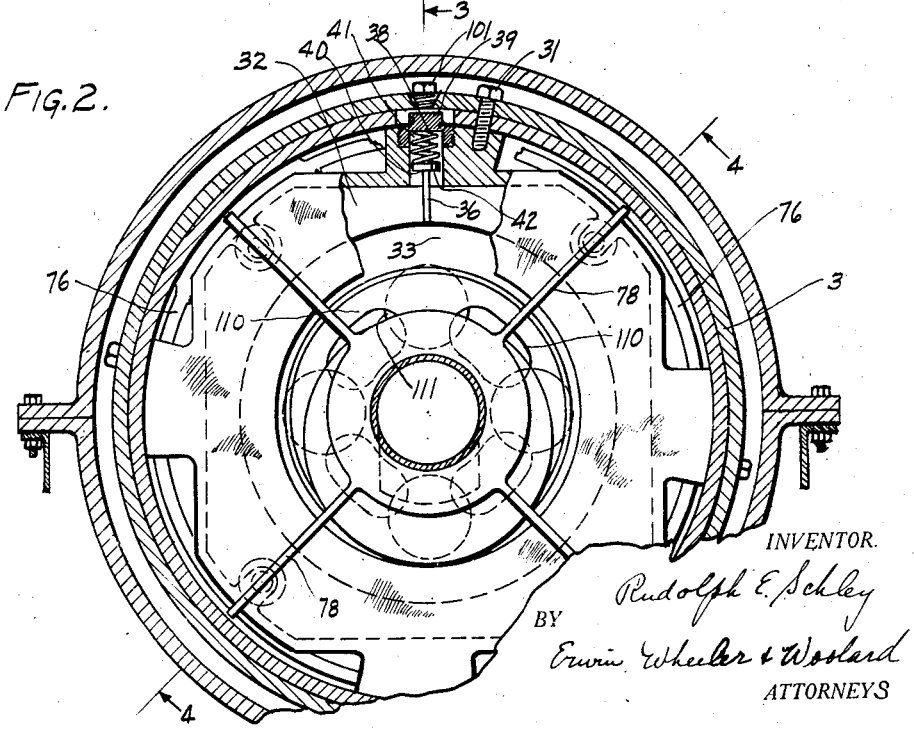
Figure 2 is a sectional view of the device taken on the line 2—2 of Fig. 3 and shows the pump in side elevation with portions in section.

Fluid entering the motor will cause a reaction between the peripheral portion 100 of the casing 60 and either of the vanes 63 when such vane is past the upper valve 67, as shown in Figure 1. When the motor disk has revolved sufficiently in a clock-wise direction, as viewed in Figure 1, fluid within the space between two of the vanes will be forced out through the lower valve 67 and into space 73 in casing 3. This latter action is obviously due to the lessening of the cubic space between any two of the vanes 63 caused by the peripheral portion 100.

If it is desired to rotate the motor disk 62 in a counter clock-wise direction, the valves 67 will be rotated by moving the ring 76 by means of the mechanism previously indicated. In this case the casing 3 will be locked against clock-wise rotation, since the reactions within the motor will be in that direction. As previously stated, this locking mechanism has been fully disclosed in my Patent No. 1,588,996 previously referred to and is not therefore here discussed in detail.

The space 73 in the casing 3 should be completely filled with fluid and such fluid may be placed in the space 73 through the opening closed by the plug 101. The hollow end of shaft 7 provides a space which will permit fluid in the transmission to expand when heated without creating internal pressures. The fluid in expanding will pass through the channel 23 in disk 24, hole 22, and force the plunger 16 to compress the spring 15. Air within the hollow portion of the shaft will pass out through the opening 12, channel 13, and aperture 14. When the fluid contracts, the plunger will move toward the open end of the shaft 7.

As shown in Figures 3 and 4, the pump disk 33 may be grooved annularly at 105 so that the sides 106 may be pressed toward each other to place them under tension. This tension will cause the sides 106 of the disk to press against the sides of the casing 30 and thereby prevent escape of fluid in the pump past the disk 33. The annular groove 105 may be sealed by a contractile ring 107 overlying the groove 105 and seated within an annular seat in the periphery of the disk 33.

The web portion 110 of the pump disk 33, web portion 111 of the chamber 21, and web portion 112 of the motor disk 62, are each provided with apertures 113, 114 and 115, respectively, to permit fluid in the space 73 to pass freely from one end thereof to the other end.

When the crank pin 34 has been moved radially of the axis of shaft 6, it will be carried thereabout and will in turn cause the pump disk 33 to vary the cubic contents of the several pump compartments. In this manner fluid will successively be drawn into the compartments and expelled therefrom. The amount of fluid thus pumped during a given number of revolutions of the shaft 6 will depend wholly upon the position of the crank pin 34 relative to the shaft 6. It will be seen, therefore, that the quantity of fluid to be delivered to the motor during a given number of revolutions of the pump may be predetermined by the setting of the crank pin from the handle 80. Consequently, as the capacity of the motor always remains the same, the amount of fluid that the pump delivers will determine the relative speeds between the shafts 6 and 7.

When the output capacity of the pump equals or exceeds the capacity of the motor and the motor is being propelled in the same direction as the shaft 6 is rotating, the reaction against the casing 3 will be equal in both directions and the casing will then rotate with the shafts 6 and 7. This action is the same as that which was fully described in my Patent No. 1,588,996, previously referred to. Therefore, there is no necessity of going into a detailed explanation in this specification.

In order that the fluids in the transmission may not pass out between the bearing and the shafts, the spring 26 is provided. This spring presses the sleeve 19 and collar 25 apart and in so doing presses the member 120 into contact with the end face 121 of the casing 3 and the collar 18 into contact with the portion 17. The member 120 and collar 18 will then act as seals to prevent fluid passing out between the bearing portions of the casing 3 and the respective shafts 6 and 7.

The motor casing 60 should be provided with a recess 125 extending from each valve 67 toward the most closely adjacent portions of the periphery 100 and the periphery of the motor disk 62. These recesses constitute a part of the annular channel 61 and serve to allow fluid between any two co-operating vanes 63 to pass around at least one of such vanes when the two vanes in question are between the two valves 67 upon the contracted side of the channel 61.

Another feature which the motor has resides in the manner of forming the channel 61. As will be observed in Figure 1, the periphery of the channel from one valve to the other and upon the right of the figure is concentric with the axis of shaft 7. As a result, when a vane 63 is traveling along this concentric portion of the channel periphery and is under pressure of the fluid entering the motor, the vane will not be changing its radial position. This eliminates any detrimental effects that might otherwise arise from the binding or frictional engagement between the vanes and the sides of their respective slots.

The valves 67 are assembled by inserting the valves in their respective openings in the side of the casing 60. The plates 126 are then secured to the side of the casing and serve as bearings for the respective valve stems. Gears 74 are then secured to the valve stems adjacent the outer faces of the plates 126.

One of the outstanding results accomplished by a device embodying the invention disclosed herein, lies in the fact that a substantially smooth operation of the transmission is obtained. This result is produced by reason of the construction of the pump and the motor. The pump delivers a substantially constant stream of fluid at a given speed and the motor accepts the fluid at a substantially constant rate at a given speed.

I claim:

1. In a variable output pump, the combination with an annular channel-shaped casing having spaced inner walls and suitable inlet and outlet ports, of an operating shaft, vane abutments yieldably carried by said casing, and a disk fitted between said walls and comprising integrally joined side faced flanges mutually spring biased to separate from each other and held in substantial parallelism by confinement between said walls, said flanges being spaced by a peripheral slot extending radially of said disk and with which said disk is provided.

2. In a pump, the combination with a casing having spaced walls, of a pumping rotor movable between said walls and peripherally slotted to provide a pair of face flange members integrally joined and sufficiently resilient to tend to expand, the outer faces of said members being held in substantial parallelism by confinement between said walls.

3. In a variable output pump, the combination with an annular casing of channeled cross section, having spaced sides and suitable inlet and outlet ports communicating with the space between said sides, of vane type abutment means yieldably mounted in said casing and retractably projecting into said space, crank means of variable throw, and a disk type piston mounted on said crank means to partake of the rotation and adjustment thereof, said piston having a peripheral slot and integrally connected face flanges spaced at opposite sides of said slot and resiliently tending to expand to a width greater than the width of the channel in said casing, said flanges being held to substantial parallelism by pressure contact with said casing.

RUDOLPH E. SCHLEY.